(12) United States Patent
Dry et al.

(10) Patent No.: US 10,596,993 B2
(45) Date of Patent: Mar. 24, 2020

(54) VEHICLE SEATING ASSEMBLY WITH ANCHORED AIRBAG TETHERS

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Brian Robert Spahn, Plymouth, MI (US); S. Benjamin Yilma, Canton, MI (US); S. M. Akbar Berry, Windsor (CA); Kevin Wayne Preuss, Berkley, MI (US); Marcos Silva Kondrad, Macomb Township, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 15/871,321

(22) Filed: Jan. 15, 2018

(65) Prior Publication Data

US 2019/0217803 A1    Jul. 18, 2019

(51) Int. Cl.
| | |
|---|---|
| *B60R 21/207* | (2006.01) |
| *B60R 21/2338* | (2011.01) |
| *B60R 21/232* | (2011.01) |
| *B60R 21/231* | (2011.01) |

(52) U.S. Cl.
CPC .......... *B60R 21/232* (2013.01); *B60R 21/207* (2013.01); *B60R 21/2338* (2013.01); *B60R 21/23138* (2013.01); *B60R 2021/23146* (2013.01); *B60R 2021/23388* (2013.01)

(58) Field of Classification Search
CPC .................. B60R 21/23138; B60R 21/207
USPC ........................................... 280/733
See application file for complete search history.

(56) References Cited

U.S. PATENT DOCUMENTS

| | | | | |
|---|---|---|---|---|
| 3,560,048 | A * | 2/1971 | Flint ................. | B60N 2/502 297/465 |
| 3,623,768 | A * | 11/1971 | Capener ............ | B60R 21/207 297/330 |
| 3,905,615 | A * | 9/1975 | Schulman .......... | B60R 21/18 280/730.1 |
| 3,981,520 | A | 9/1976 | Pulling | |
| 4,508,294 | A | 4/1985 | Lorch | |
| 7,258,188 | B2 * | 8/2007 | Chernoff .......... | B60R 21/18 180/268 |
| 8,448,983 | B2 * | 5/2013 | Fukawatase ...... | B60R 21/18 280/733 |
| 8,690,187 | B2 * | 4/2014 | Fukawatase ...... | B60R 21/207 280/730.2 |

(Continued)

FOREIGN PATENT DOCUMENTS

EP    2510838 A1    10/2012

*Primary Examiner* — Faye M Fleming
(74) *Attorney, Agent, or Firm* — David Coppiellie; Price Heneveld LLP

(57) ABSTRACT

A vehicle seating assembly is provided herein. The vehicle seating assembly includes a seatback coupled to a seat-base. An airbag assembly is coupled to the seatback and configured to deploy therefrom. A tether is coupled to the airbag assembly and at least one of the seatback and the seat-base. An anchoring feature is coupled to at least one of the seatback and the seat-base and is configured to restrain seating-assembly-upward movement of the tether.

20 Claims, 13 Drawing Sheets

(56) References Cited

U.S. PATENT DOCUMENTS

| | | | |
|---|---|---|---|
| 8,702,123 B2* | 4/2014 | Mazanek | B60R 21/207 |
| | | | 280/729 |
| 9,102,300 B2* | 8/2015 | Faruque | B60R 21/261 |
| 9,758,127 B1* | 9/2017 | Farooq | B60R 22/26 |
| 2006/0119083 A1* | 6/2006 | Peng | B60R 21/207 |
| | | | 280/730.2 |
| 2018/0290619 A1* | 10/2018 | Kitagawa | B60R 21/23138 |
| 2019/0176744 A1* | 6/2019 | Yoo | B60R 21/23138 |
| 2019/0217805 A1* | 7/2019 | Dry | B60R 21/2338 |

* cited by examiner

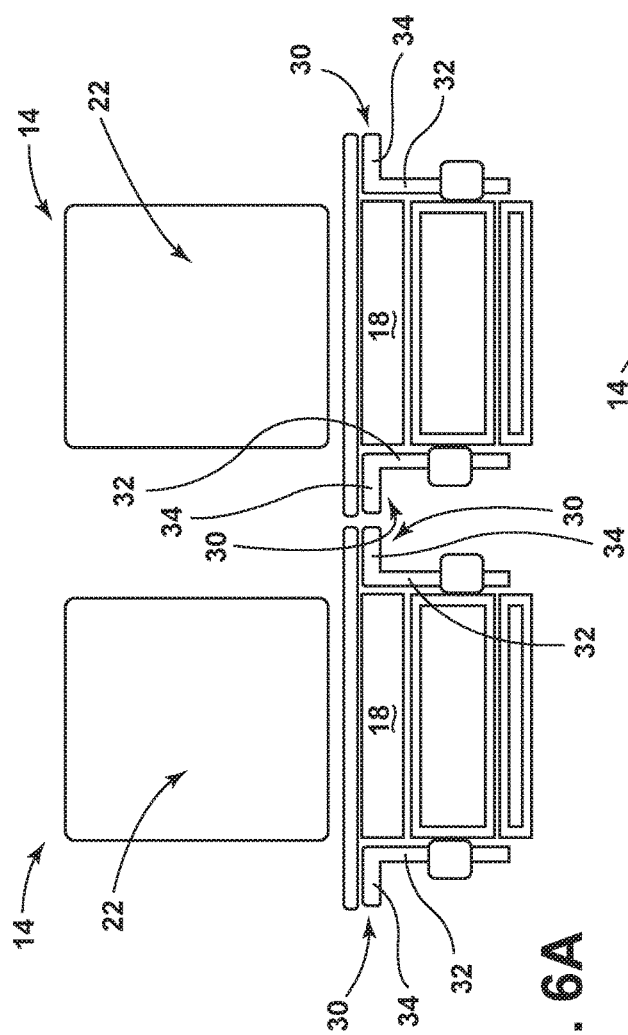
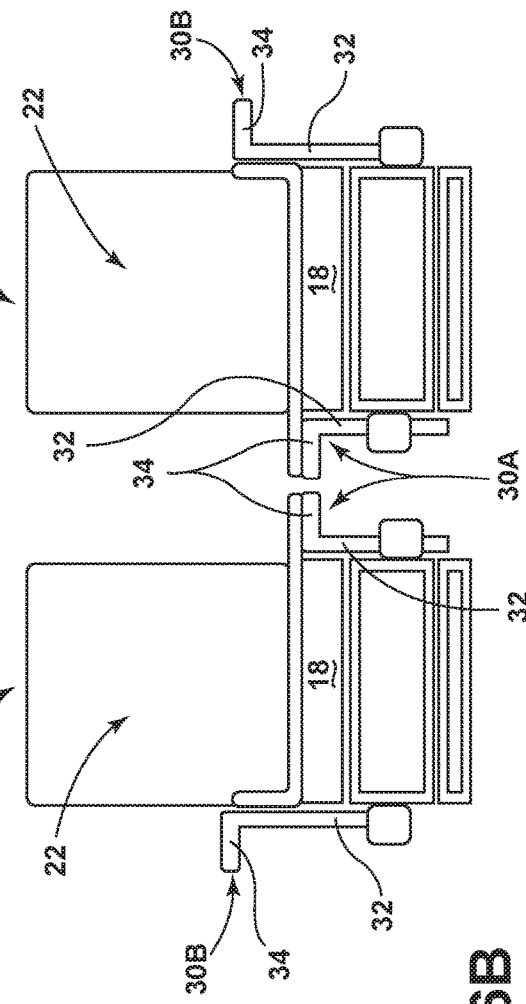

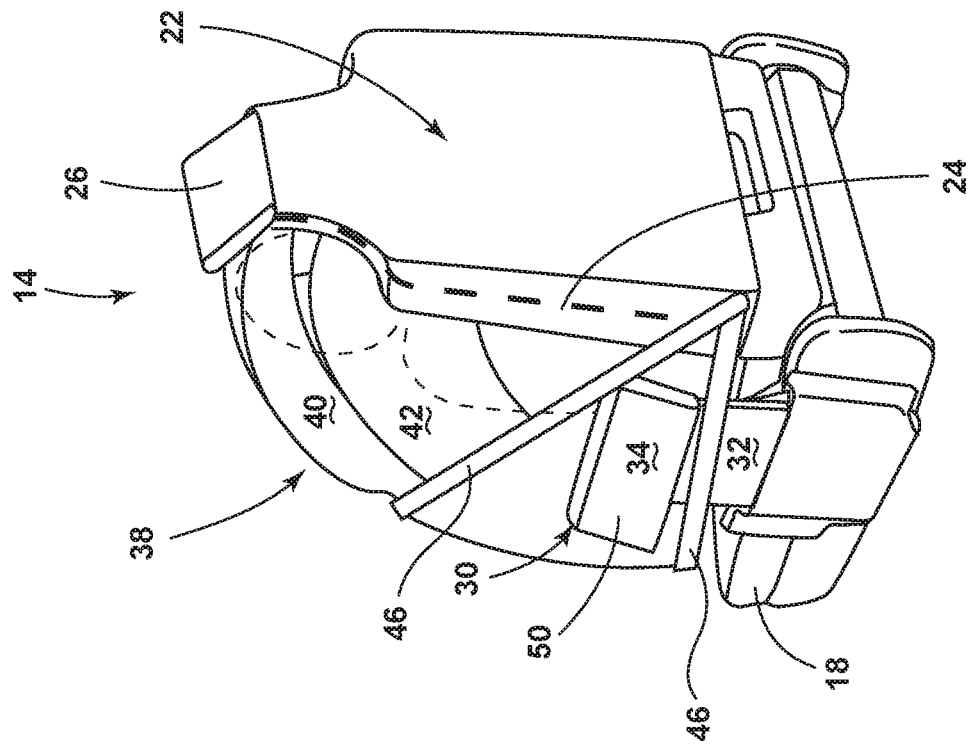
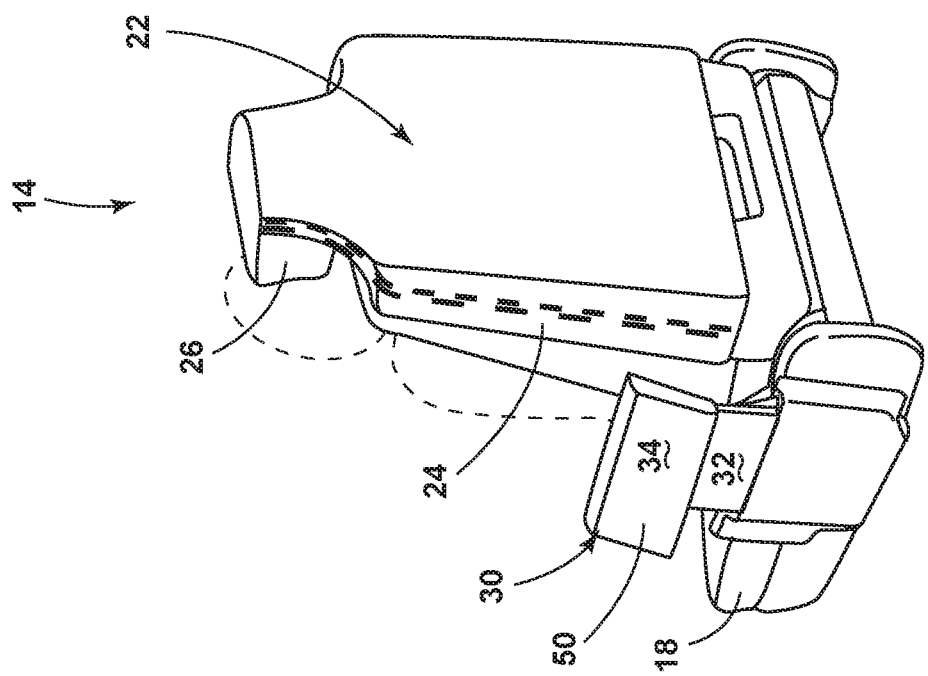
FIG. 9B
FIG. 9A

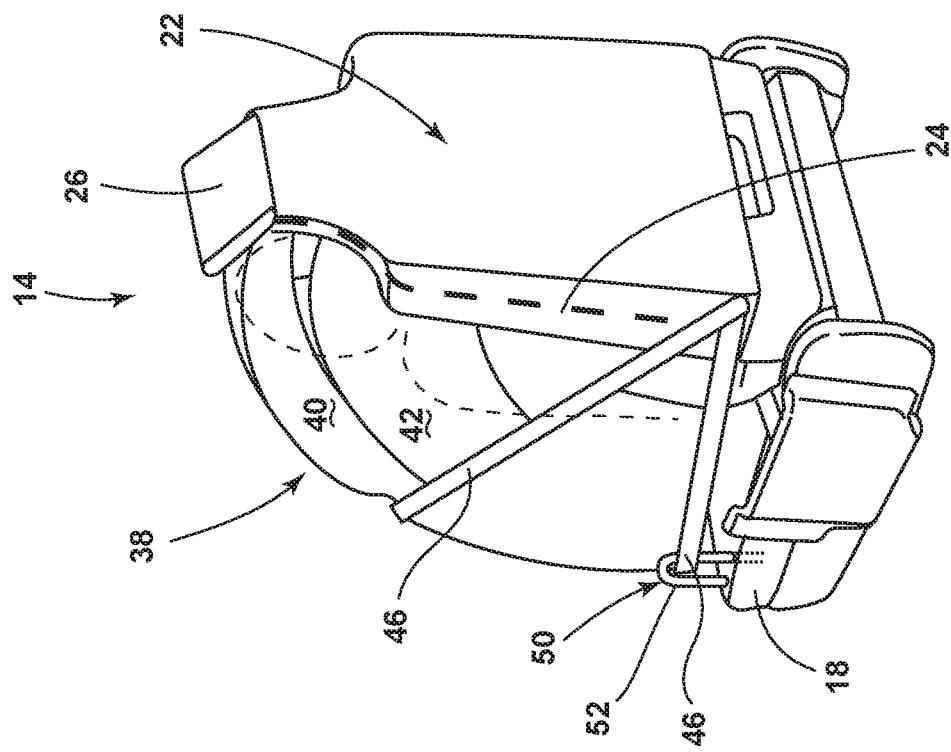
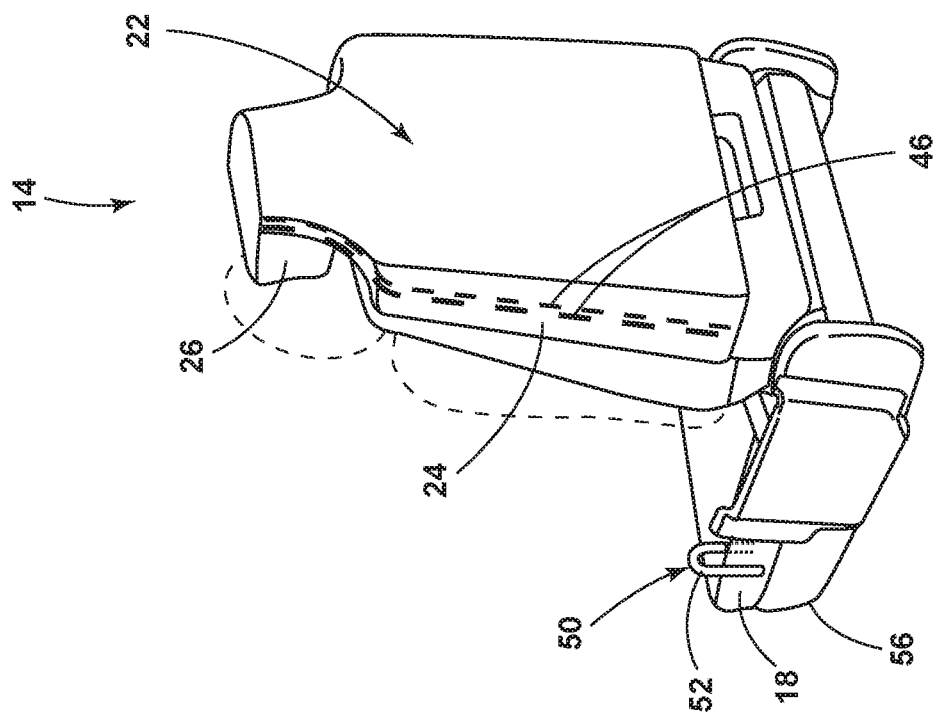
FIG. 10B
FIG. 10A bly, illustrating a support member of the armrest in a
VEHICLE SEATING ASSEMBLY WITH ANCHORED AIRBAG TETHERS

FIELD OF THE INVENTION

The present disclosure generally relates to vehicles and, more particularly, to vehicle seating assemblies.

BACKGROUND OF THE INVENTION

Autonomous vehicles create a new expectation of occupant freedom of movement within a vehicle. This may challenge conventional wisdom for fixed airbag placement and airbag design.

SUMMARY OF THE INVENTION

According to one aspect of the present disclosure, a vehicle seating assembly includes a seatback coupled to a seat-base. An airbag assembly is coupled to the seatback and is configured to deploy therefrom. A tether is coupled to the airbag assembly and at least one of the seatback and the seat-base. A cable is coupled to the tether. A retractor is coupled to the seat-base and is configured to retract the cable.

Embodiments of the first aspect of the invention can include any one or a combination of the following features:
- the airbag assembly comprises a side airbag configured to deploy out of a lateral side of the seatback;
- the airbag assembly comprises an overhead airbag configured to deploy seating-assembly-laterally-inboard of the side airbag;
- the retractor is configured to retract the cable when the airbag is in a deployed position; and
- the cable is partially disposed within at least one of the seat-base and the seatback while the airbag is in a pre-deployment position.

According to another aspect of the present disclosure, a seating assembly includes a seatback coupled to a seat-base. An airbag assembly is coupled to the seatback and configured to deploy therefrom. A tether is coupled to the airbag assembly and at least one of the seatback and the seat-base. An anchoring feature is coupled to at least one of the seatback and the seat-base and is configured to restrain seating-assembly-upward movement of the tether.

Embodiments of the second aspect of the invention can include any one or a combination of the following features:
- the airbag assembly comprises a side airbag configured to deploy out of a lateral side of the seatback;
- the airbag assembly comprises an overhead airbag configured to deploy seating-assembly-laterally-inboard of the side airbag;
- the anchoring feature comprises a cable and a retractor configured to retract the cable;
- the anchoring feature comprises an auxiliary hook coupled to the seat-base;
- the auxiliary hook is operable between a stowed position and a use position; and
- the anchoring feature comprises an armrest.

According to yet another aspect of the present disclosure, a method of operating a vehicle seating assembly includes the steps of deploying an airbag assembly from a seatback of a vehicle seating assembly that includes a seat-base coupled to the seatback, restraining seating-assembly-forward-movement of the airbag assembly with a tether coupled to the airbag assembly, and restraining seating-assembly-upward movement of the tether with an anchoring feature coupled to the seat-base.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 6A is a front elevational view of two seating assemblies, illustrating the seating assemblies in a couch configuration, according to one embodiment;

FIG. 6B is a front elevational view of two seating assemblies, illustrating the seating assemblies in a love seat configuration, according to one embodiment;

FIG. 9A is a side elevational view of the seating assembly with the airbag assembly in the pre-deployment position, illustrating a tether disposed within a seatback of the seating assembly, according to one embodiment;

FIG. 9B is a side elevational view of the seating assembly with the airbag assembly in the deployed position, illustrating the armrest doubling as an anchoring feature, according to one embodiment;

FIG. 10A is a side elevational view of the seating assembly with the airbag assembly in the pre-deployment position, illustrating an auxiliary hook in a stowed position, according to one embodiment;

FIG. 10B is a side elevational view of the seating assembly with the airbag assembly in the deployed position, illustrating the auxiliary hook in a use position, according to one embodiment;

DETAILED DESCRIPTION OF THE PREFERRED EMBODIMENTS

Figure 1:
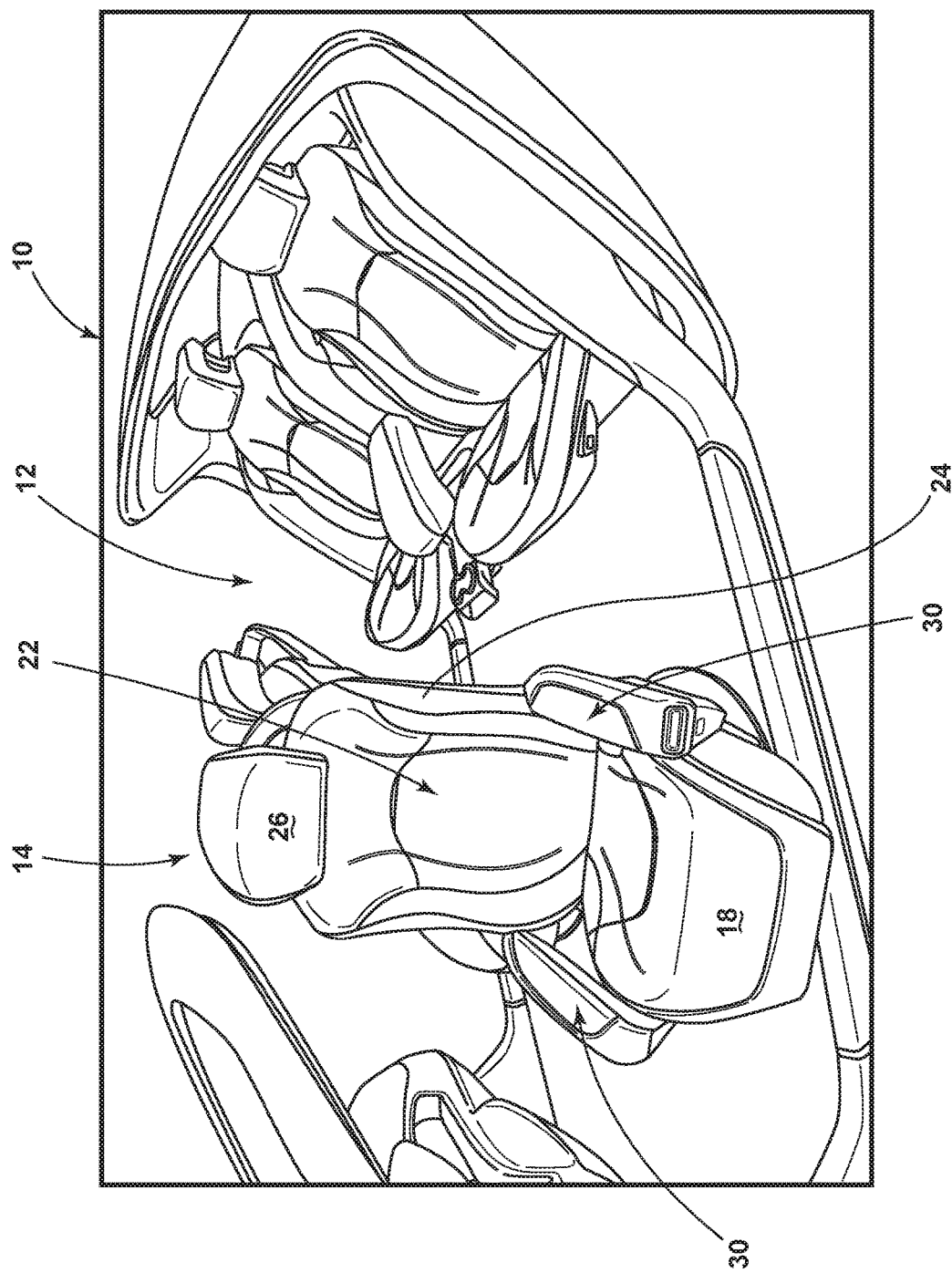
FIG. 1 is a perspective view of a vehicle interior equipped with a seating assembly having an airbag assembly in a pre-deployment position, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-13, a vehicle 10 has a vehicle interior 12. The vehicle interior 12 includes a seating assembly 14. The seating assembly 14 includes a seat-base 18 and a seatback 22 coupled to the seat-base 18. An airbag assembly 38 is coupled to the seatback 22 and is configured to deploy therefrom. A tether 46 is coupled to the airbag assembly 38 and at least one of the seatback 22 and the seat-base 18, wherein the tether 46 is configured to bias the airbag assembly 38 seating-assembly-downward when the airbag assembly 38 is in a deployed position.

Figure 2:
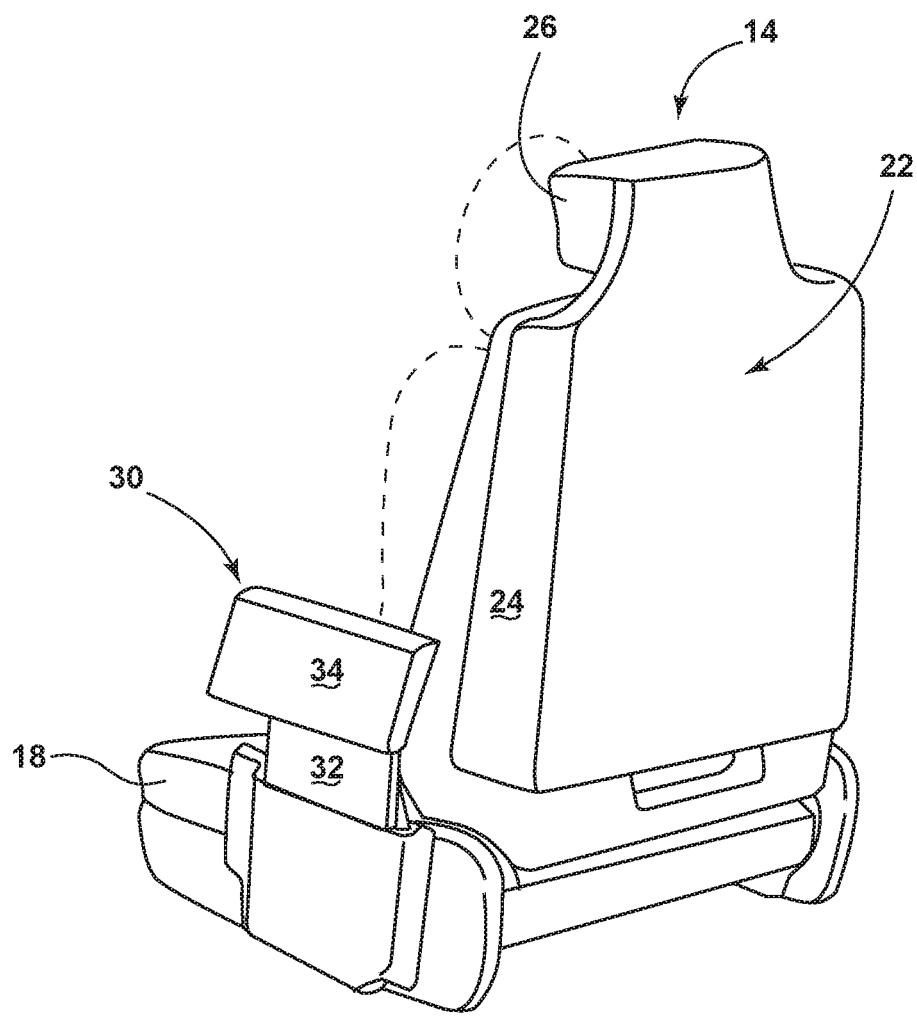
FIG. 2 is a side elevational view of the seating assembly having an armrest, according to one embodiment.

Referring now to FIGS. 1 and 2, the vehicle 10 includes the seating assembly 14. The seating assembly 14 may include a seat-base 18 and a seatback 22 coupled to the seat-base 18. In some embodiments, the seatback 22 may be pivotally coupled to the seat-base 18. The seat-base 18 may be movably coupled to the vehicle 10. For example, in some embodiments, the seat-base 18 may move along a track system coupled to the vehicle 10. The seating assembly 14 may move in vehicle forward and rearward directions as is typical of vehicle seating assemblies. In some embodiments, the seating assembly 14 may move in various directions within the vehicle 10 and/or rotate or swivel relative to the vehicle 10 such that the seating assembly 14 may face various vehicular directions. It is contemplated that the vehicle 10 may include multiple movable seating assemblies 14 and that strategic movement of the seating assemblies 14 may provide occupants with different seating assembly configurations, such as modular couches and/or love seats.

The seatback 22 may include a headrest 26. In some embodiments, the headrest 26 may be an extension of the seatback 22. In other words, at least a portion of the headrest 26 may be integrally coupled with at least a portion of the seatback 22. In some embodiments, the headrest 26 may be movable relative to the remainder of the seatback 22. For example, the headrest 26 may be adjusted to accommodate seating assembly occupants of differing height. The seatback 22 may include a lateral side 24. In some embodiments, the lateral side 24 may generally face a direction that is generally perpendicular to the seating-assembly-forward and/or seating-assembly-rearward directions. In other words, the lateral side 24 may face seating-assembly-left or seating-assembly-right. It is contemplated that the lateral side 24 may include a plurality of lateral sides 24. For example, the seatback 22 may include a right lateral side 24 and a left lateral side 24.

Referring further to FIGS. 1 and 2, an armrest 30 may be coupled to the seating assembly 14. The armrest 30 may be coupled to the seatback 22 and/or seat-base 18. The armrest 30 may be operable between various positions. For example, in some embodiments, relative to the seating assembly 14, the armrest 30 may move, pivot, slide, and/or articulate forward, rearward, upward, downward, inboard, outboard, and/or a combination thereof.

Figure 3A:
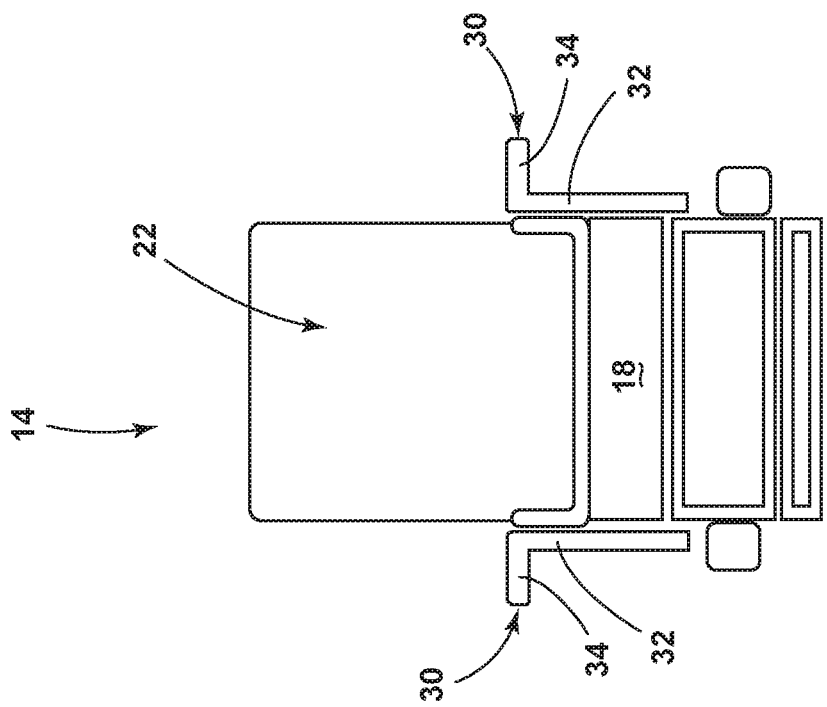
FIG. 3A is a front elevational view of the seating assembly, illustrating a support member of the armrest in a lowered position, according to one embodiment.
Figure 3B:
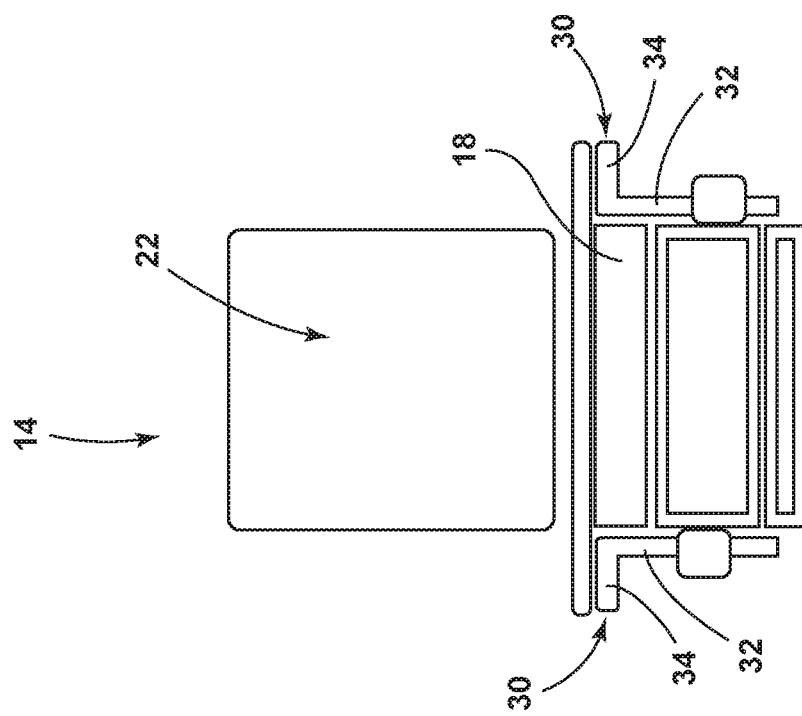
FIG. 3B is a front elevational view of the seating assembly, illustrating the support member of the armrest in a raised position, according to one embodiment.

In some embodiments, the armrest 30 may include multiple components. The components may be operable between various positions. For example, as shown in FIGS. 2-3B, the armrest 30 may include a support member 32 and a bolster 34. The support member 32 may be coupled to the seat-base 18. In some embodiments, the support member 32 may be operable to move seating-assembly-upward and seating-assembly-downward. Accordingly, the support member 32 may be operable between a lowered position and a raised position, as depicted by FIGS. 3A and 3B respectively. It is contemplated that, in some embodiments, the support member 32 may additionally move other seating-assembly-directions relative to the seat-base 18.

Figure 4C:
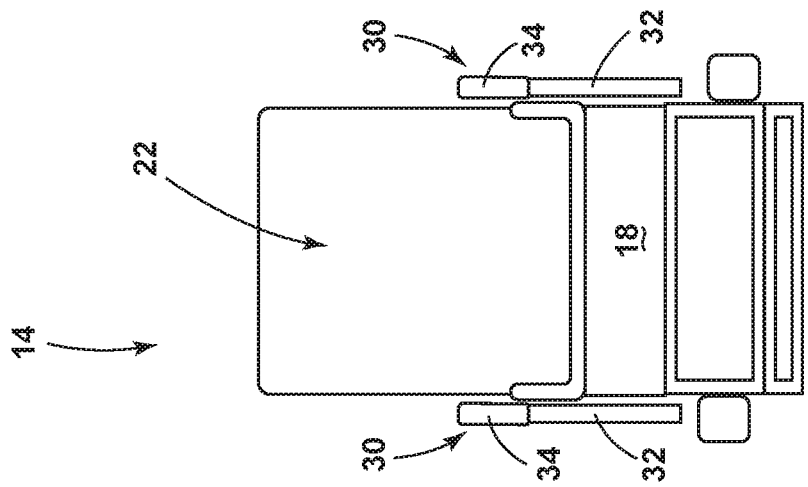
FIG. 4C is a front elevational view of the seating assembly, illustrating the bolster of the armrest in the inboard position, according to one embodiment.
Figure 4B:
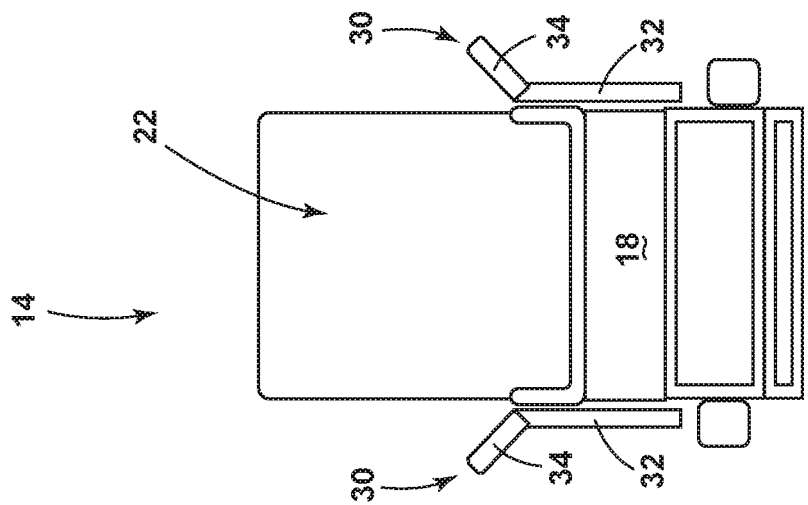
FIG. 4B is a front elevational view of the seating assembly, illustrating the bolster of the armrest in a position between the outboard position and an inboard position, according to one embodiment.
Figure 4A:
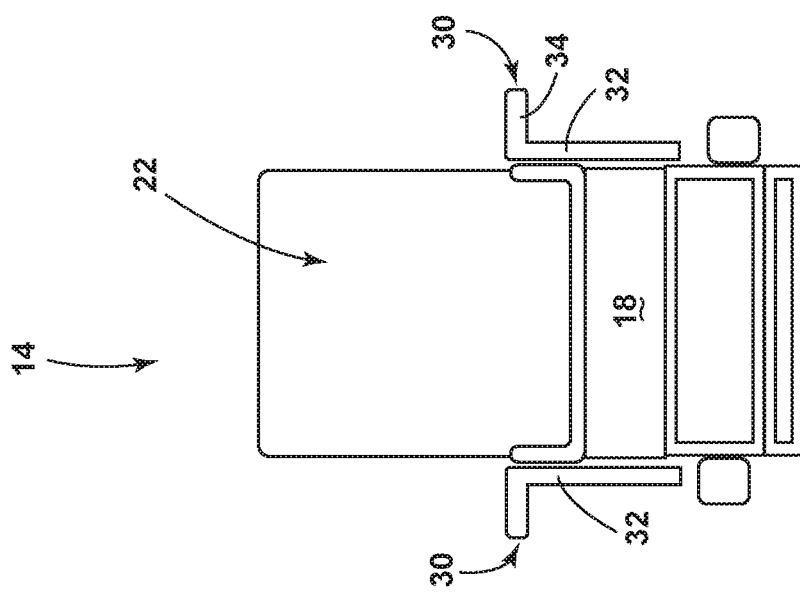
FIG. 4A is a front elevational view of the seating assembly, illustrating a bolster of the armrest in an outboard position, according to one embodiment.
Figure 5A:
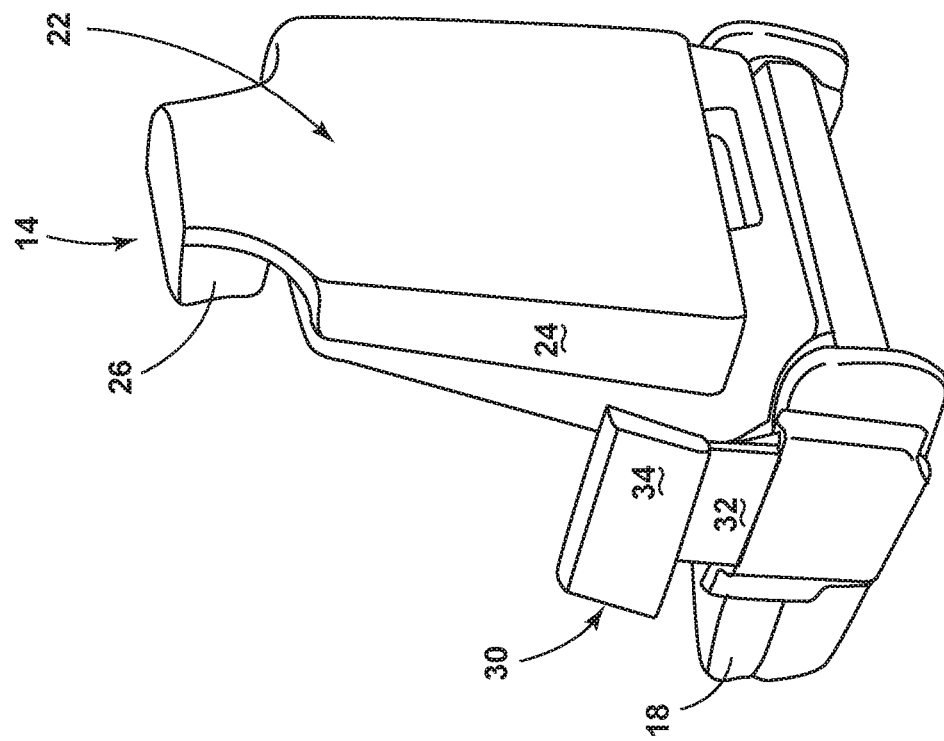
FIG. 5A is a side elevational view of the seating assembly, illustrating the bolster of the armrest in a rearward position, according to one embodiment.
Figure 5B:
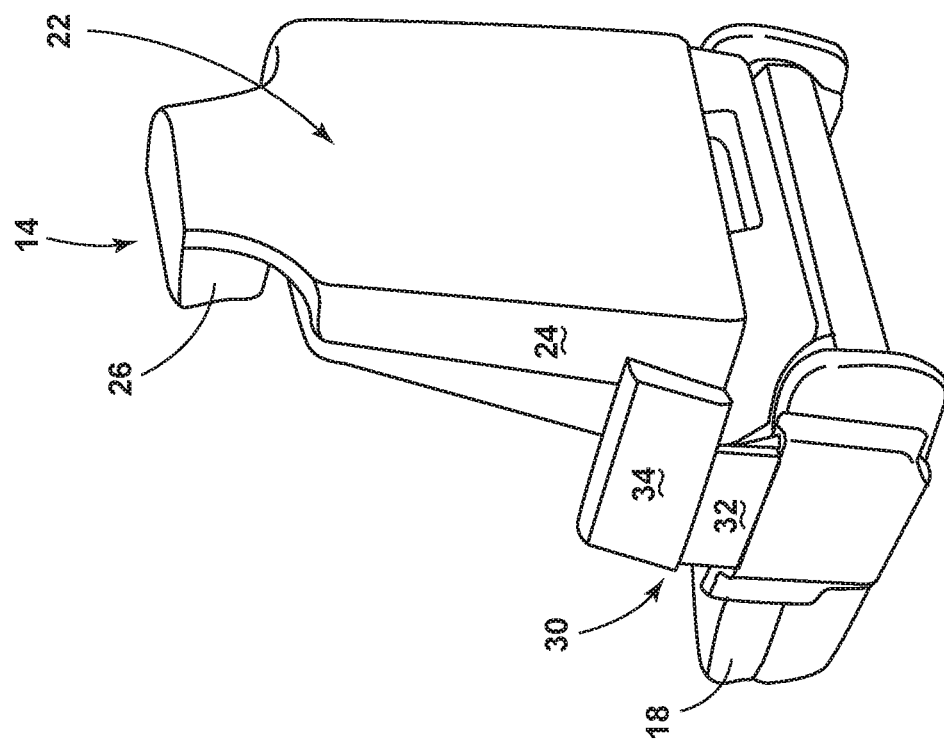
FIG. 5B is a side elevational view of the seating assembly, illustrating the bolster of the armrest in a forward position, according to one embodiment.

In various embodiments, the bolster 34 may be coupled to the support member 32. As shown in FIGS. 3A and 3B, the bolster 34 may move seating-assembly-upward and seating-assembly-downward with the support member 32. In some embodiments, the bolster 34 may protrude beyond the support member 32 in the seating-assembly-forward direction. In some embodiments, the bolster 34 may be movably coupled to the support member 32. For example, as shown in FIGS. 4A-4C, the bolster 34 may be articulable relative to the support member 32 such that the bolster 34 may articulate in the seating-assembly-inboard and seating-assembly-outboard directions. Thus, the bolster 34 may be operable between an inboard position and an outboard position, as shown in FIGS. 4C and 4A respectively. The bolster 34 may further be operable to a position between the inboard position and the outboard position, as depicted in FIG. 4B. In some embodiments, the bolster 34 may be operable to move in the seating-assembly-forward and seating-assembly-rearward directions. Accordingly, as shown in FIGS. 5A-5B, the bolster 34 may be operable between a forward position and a rearward position. It is contemplated that the seating assembly 14 may have a plurality of armrests 30.

The mobility of the armrests 30 and/or components of the armrests 30 may allow for a variety of seating assembly configurations. For example, as shown in FIG. 4A, the armrests 30 may be positioned such that the seating assembly 14 resembles a captain's chair. In some embodiments, the support members 32 of the armrests 30 are in the raised position and the bolsters 34 are in the outboard position while the seating assembly 14 is configured as a captain's chair. As shown in FIG. 6A, the armrests 30 of multiple side-by-side seating assemblies 14 may be configured such that the seating assemblies 14 resemble a couch. For example, in one embodiment, the support members 32 of the armrests 30 are in the lowered position and the bolsters 34 of the armrests 30 are in the outboard position while the seating assemblies are configured as a couch. As shown in FIG. 6B, the armrests 30 of multiple side-by-side seating assemblies 14 may be configured such that the seating assemblies 14 resemble a love seat. For example, in one embodiment, the support member 32 of an inner armrest 30A of each of the two side-by-side seating assemblies 14 is in the lowered position, the support member 32 of an outer armrest 30B of each of the two side-by-side seating assemblies 14 is in the raised position, and the bolsters 34 of the armrests 30 are in the outboard position while the two seating assemblies 14 are configured as a love seat.

Figure 7A:
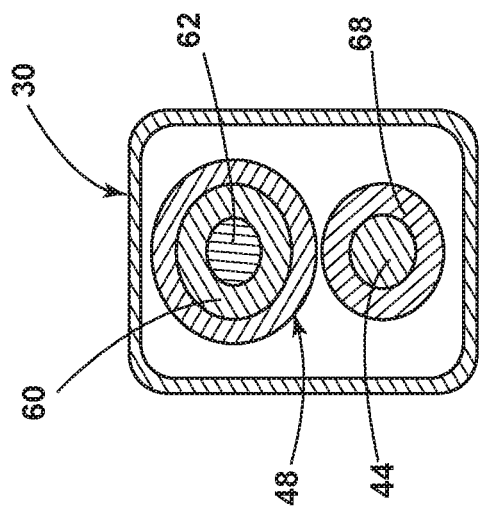
FIG. 7A is a cross-sectional view taken through line VIIA-VIIA of FIG. 7, illustrating the propulsion feature and the propulsion system coupled to the seating assembly, according to one embodiment.
Figure 7:
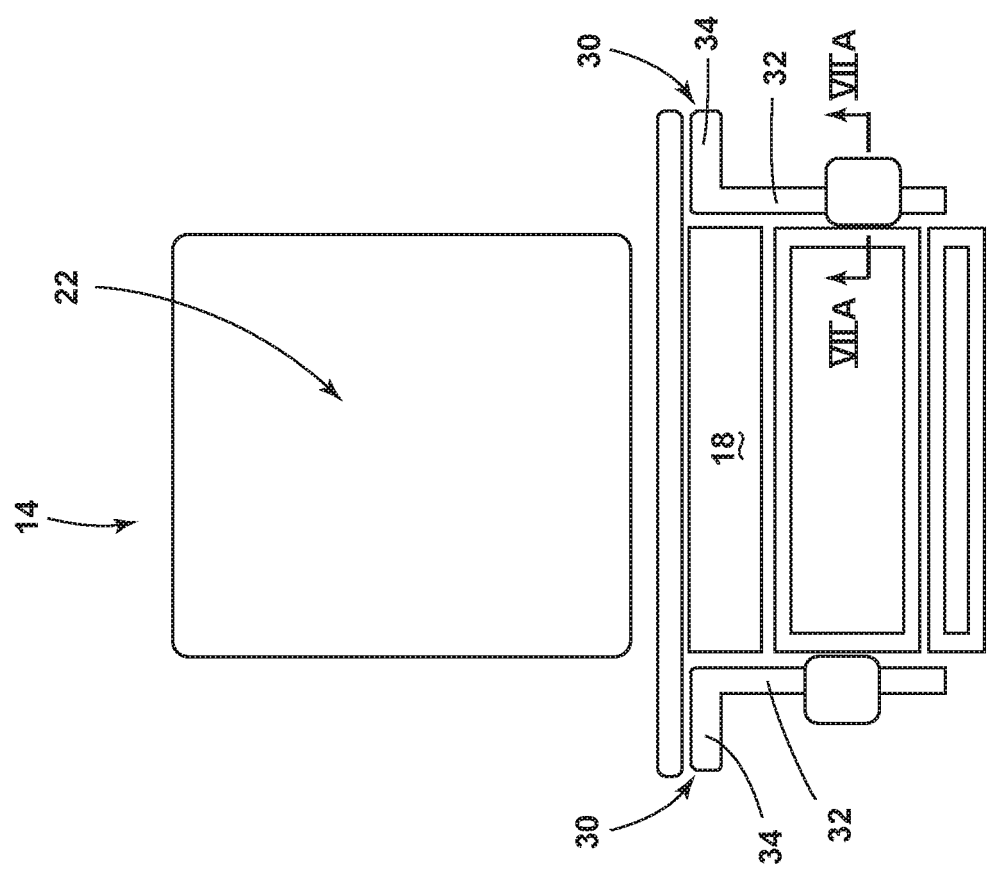
FIG. 7 is a front elevational view of the seating assembly, illustrating a propulsion feature and a propulsion system coupled to the seating assembly, according to one embodiment.

In reference to FIGS. 7-7A, a propulsion feature 44 configured to move the armrest 30 may be coupled to the seating assembly 14, the seat-base 18, and/or armrest 30. In some embodiments, the propulsion feature 44 may include an electric motor. In some embodiments, the propulsion feature 44 may include a pyrotechnic mechanism. It is contemplated that the propulsion feature 44 may be at least one of a variety of other devices configured to move the armrest 30.

In further reference to FIGS. 7-7A, a propulsion system 48 configured to engage with the propulsion feature 44 may be coupled to the armrest 30. In some embodiments, the propulsion system 48 may be coupled to/and/or engage with the armrest 30, the support member 32, and/or the bolster 34 of the armrest 30. It is contemplated, that in some embodiments, the propulsion system 48 may include at least one of variety of devices to engage with the propulsion feature 44 (e.g., solenoid, piston assembly, etc.) In some embodiments, the propulsion system 48 may include a recirculating ball race nut 60. The recirculating ball race nut 60 may be coupled to the seating assembly 14, the seat-base 18, and/or the armrest 30. Further, the recirculating ball race nut 60 may be operably coupled to the propulsion feature 44. The recirculating ball race nut 60 may engage with a threaded driver screw 62. The threaded driver screw 62 may have a mechanically reversible thread. The threaded driver screw 62 may be coupled to the armrest 30, the bolster 34, and/or the support member 32.

In operation, the propulsion feature 44 may be configured to rotate the recirculating ball race nut 60; the recirculating ball race nut 60, in turn, drives the threaded driver screw 62, which subsequently moves the armrest 30, the support member 32 and/or the bolster 34. In an example in which the threaded driver screw 62 has a mechanically reversible thread, the armrest 30, the support member 32, and/or the bolster 34 may be moved back and forth depending on the direction of the recirculating ball race nut's 60 rotation. For example, the bolster 34 may be moved from the inboard position to the outboard position as well as from the outboard position to the inboard position. It is contemplated that the propulsion system 48 may include a plurality of propulsion systems 48 that correspond to one or a plurality of propulsion features 44. It is further contemplated that, in some embodiments, the support member 32 and the bolster 34 may engage with and be moved by a singular one of the propulsion system 48, or the support member 32 and the bolster 34 may engage with and be moved by separate propulsion systems 48.

In some embodiments, the propulsion feature 44 may be controlled by an occupant. For example, the occupant may operate a switch that is configured to control the propulsion feature 44. In such an example, the occupant may engage the switch, which subsequently prompts the propulsion feature 44 to power move the armrest 30, the support member 32, and/or the bolster 34. In some embodiments, the armrest 30, the support member 32, and/or the bolster 34 may be manually moved by the occupant. In this way, the armrest 30, the support member 32 and/or the bolster 34 may be moved by the occupant without engaging the propulsion feature 44.

Referring further to FIG. 7-7A, a locking feature 68 may be coupled to the armrest 30, the support member 32, and/or the bolster 34. The locking feature 68 may be configured to substantially prevent movement of the armrest 30, the support member 32, and/or the bolster 34 relative to the seat-base 18, seatback 22 and/or the support member 32. The locking feature 68 may include at least one of a host of mechanisms configured to prevent movement (e.g., pin, stop, dog, detent, abutment, etc.). In some embodiments, the locking feature 68 may include the propulsion feature 44 (e.g. electric motor). For example, an electric motor that is configured to move the armrest 30, the support member 32, and/or the bolster 34 may also lock the armrest 30, the support member 32, and/or the bolster 34 in place by continuous activation. In some embodiments, the locking feature 68 may be manually engaged and/or disengaged by the occupant. For example, the locking feature 68 may be engaged and/or disengaged by operation of a switch. In some embodiments, the locking feature 68 is engaged by default, and the armrest 30, the support member 32, and/or the bolster 34 may be moved upon disengagement of the locking feature 68. In some embodiments, the locking feature 68 may be engaged and/or disengaged by a controller 70, which will be discussed in greater detail below.

Figure 8:
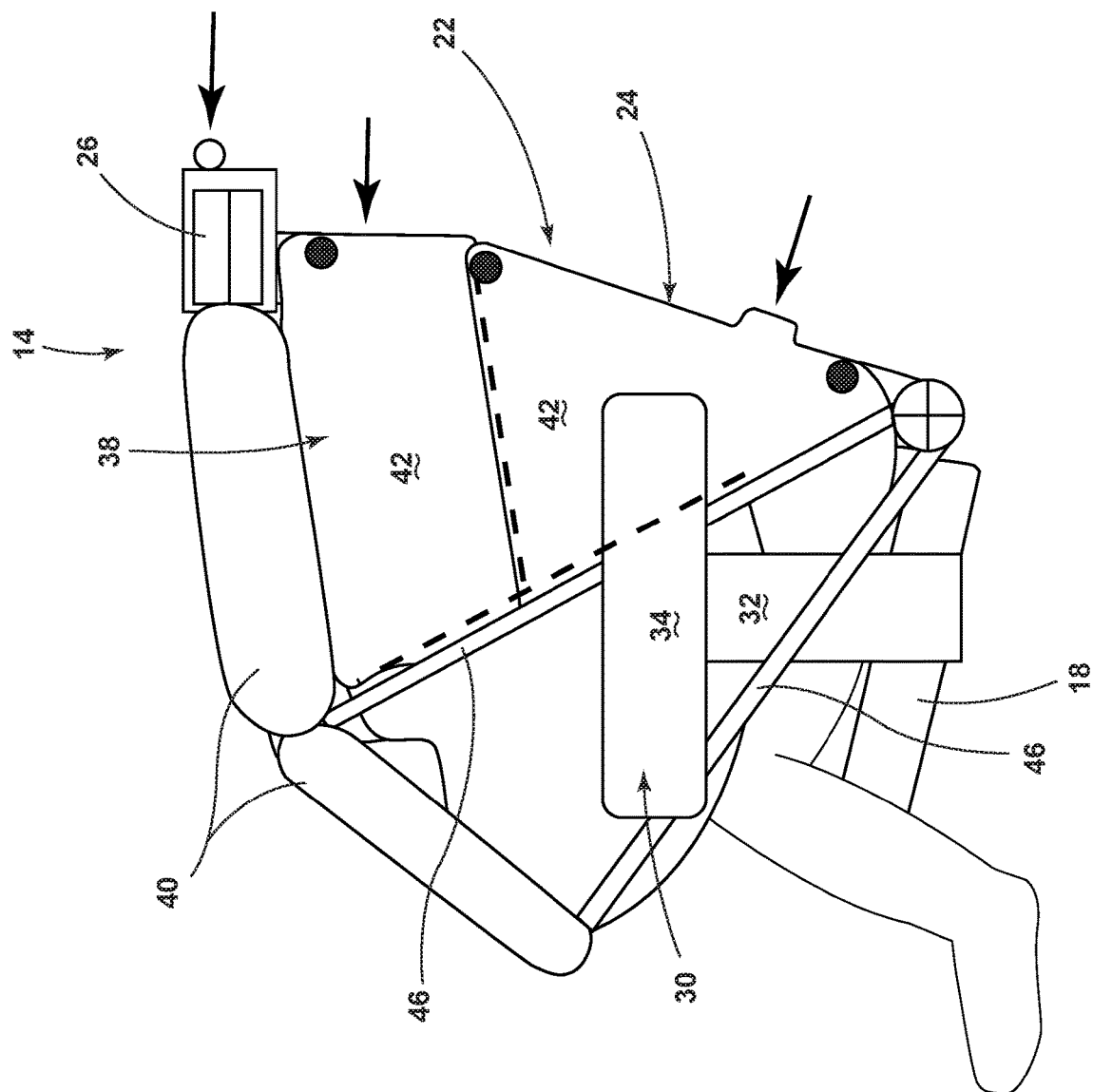
FIG. 8 is a side elevational view of the seating assembly, illustrating the airbag assembly in a deployed position, according to one embodiment.

In reference to FIG. 8, in various embodiments, the seating assembly 14 may include an airbag assembly 38. The airbag assembly 38 may be coupled to the seatback 22 and configured to deploy therefrom. In some embodiments, the airbag assembly 38 may be coupled to the headrest 26 and configured to deploy therefrom. It is contemplated that the airbag assembly 38 may be coupled to and/or disposed within a feature coupled to the headrest 26 and/or the seatback 22 (e.g., external airbag compartment) and configured to deploy therefrom. The airbag assembly 38 may be configured to deploy out of the lateral side 24 of the seatback 22. The airbag assembly 38 may be operable between a pre-deployment position, wherein the airbag assembly 38 has yet to deploy from the seatback 22 and/or headrest 26, and a deployed position, wherein the airbag assembly 38 has already deployed and/or is in the process of deploying. In some embodiments, the airbag assembly 38 is in the deployed position while the airbag assembly 38 is in a fully expanded position. In various embodiments, the airbag assembly 38 may be disposed within the seatback 22, the headrest 26, and/or a feature coupled to the headrest 26 and/or seatback 22 (e.g., external airbag compartment), while in the pre-deployment position.

In some embodiments, the airbag assembly 38 may include one or more airbags. For example, as shown in FIG. 8, in some embodiments, the airbag assembly 38 may include an overhead airbag 40 and/or a side airbag 42. In various embodiments, the side airbag 42 may be disposed within the seatback 22, while the airbag assembly 38 is in the pre-deployment position. It is contemplated that, in some embodiments, the side airbag 42 may additionally be disposed within the headrest 26, while the airbag assembly 38 is in the pre-deployment position. In various embodiments, the side airbag 42 may be configured to deploy out of the lateral side 24 of the seatback 22. It is contemplated that the side airbag 42 may be a plurality of side airbags 42. For example, the side airbag 42 may include multiple side airbags 42 each of which is configured to deploy out of one lateral side 24 of the seatback 22. In another example, the side airbag 42 may include multiple side airbags 42 configured to deploy out of multiple lateral sides 24 of the seatback 22.

In various embodiments, the overhead airbag 40 may be disposed within the headrest 26, the seatback 22, and/or a feature coupled to the headrest 26 and/or seatback 22 (e.g., external airbag compartment), while the airbag assembly 38 is in the pre-deployment position. The overhead airbag 40 may be configured to deploy out of the headrest 26 and/or seatback 22. In some embodiments, the overhead airbag 40 may be configured to deploy seating-assembly-laterally-inboard of the side airbag 42. In some embodiments, the overhead airbag 40 may be configured to deploy seating-assembly-upwards of the side airbag 42. It is contemplated that the overhead airbag 40 may include a plurality of overhead airbags 40. It is further contemplated that the plurality of overhead airbags 40 may be coupled to one another and/or to one or more of the plurality of side airbags 42, which may also be coupled to one another.

Referring now to FIGS. 8-9A, the tether 46 may be coupled to at least one of the seatback 22 and/or the seat-base 18. In various embodiments, the tether 46 may be coupled to at least one of the seatback 22 and the seat-base 18 at multiple junctions. For example, the tether 46 may be coupled to the left lateral side 24 of the seatback 22 (shown in FIG. 8) and the right lateral side 24 of the seatback 22 (not shown in FIG. 8). As shown in FIG. 8, a portion of the tether 46 may be generally fixedly coupled to at least one of the seatback 22 and the seat-base 18, such that it is configured to be stay coupled while the airbag assembly 38 is in the pre-deployment position and the deployed position. In various embodiments, the tether 46 may be at least partially disposed within the seatback 22 when the airbag assembly 38 is in the pre-deployment position. In other words, the tether 46 may be partially, majorly, substantially, and/or completely disposed within the seatback 22, while the airbag assemblies 38 is in the pre-deployment position. In some embodiments, the tether 46 may be at least partially disposed within the headrest 26, while in the pre-deployment position. In some embodiments, the tether 46 may be at least partially disposed within the seatback 22 when at least one of the overhead airbag 40 and the side airbag 42 are in the pre-deployment position.

In various embodiments, the tether 46 may be coupled to the airbag assembly 38. In some embodiments, the tether 46 may be coupled to the overhead airbag 40 and/or the side airbag 42. It is contemplated that tether 46 may be coupled to the airbag assembly 38 by a variety of coupling means (e.g., sewing, adhesive, belt-looped, etc.). It is further contemplated that, in some embodiments, the tether 46 may couple the side airbag 42 to the overhead airbag 40.

In some embodiments, when airbag assembly 38 deploys, the tether 46 may move from within the seatback 22 to a position at least partially out of the seatback 22. In other words, the tether 46 may move to a position in which the tether 46 is partially, majorly, substantially, and/or completely out from within the seatback 22. In some embodiments, the tether 46 may move out of the seatback 22 through the lateral side 24 of the seatback 22. In various embodiments, the tether 46 may be configured to directionally bias the airbag assembly 38 when the airbag assembly 38 is in the deployed position. In other words, the tether 46 may restrain and/or guide movement of the airbag assembly 38 during and/or after deployment of the airbag assembly 38. In some embodiments, the tether 46 may be configured to bias the airbag assembly 38 in the seating-assembly-downward direction when the airbag assembly 38 is in the deployed position. In some embodiments, the tether 46 may be configured to restrain seating-assembly-upward movement of the airbag assembly 38 while the airbag assembly 38 is in the deployed position. In some embodiments, the tether 46 may be configured to restrain seating-assembly-forward movement of the airbag assembly 38 when the airbag assembly 38 is in the deployed position. In some embodiments, the tether 46 may be configured to bias the airbag assembly 38 seating-assembly-laterally-inboard and/or restrain seating-assembly-laterally-outboard movement of the airbag assembly 38, while the airbag assembly 38 is in the deployed position.

As depicted in FIG. 8, in some embodiments, the tether 46 may include a plurality of tethers 46. In the embodiment shown, two tethers 46 are included on each side of the seating assembly 14. In operation, having a one or more tethers 46 coupled to each side of the seating assembly 14 may guide the movement of the airbag assembly 38 during deployment and/or may provide directional support for the airbag assembly 38 to cushion and retain a seat occupant in the event of a crash. In some embodiments, the plurality of tethers 46 may be generally fixedly coupled to the seating assembly 14 at generally the same area of the seating assembly 14, as shown in FIG. 8. In some embodiments, the plurality of tethers 46 may be generally fixedly coupled to the seating assembly 14 at different areas of the seating assembly 14. In various embodiments, the plurality of tethers 46 may be coupled to different portions of the airbag assembly 38. As shown in FIG. 8, in some embodiments, at least one of the plurality of tethers 46 may be configured to be hooked under the armrest 30, while the airbag assembly 38 is in the deployed position.

Referring now to FIGS. 9A-11B, an anchoring feature 50 is coupled to at least one of the seatback 22 and the seat-base 18. In various embodiments, the anchoring feature 50 may be configured to restrain movement of the tether 46 while the airbag assembly 38 is in the deployed position. In some embodiments, the anchoring feature 50 may be configured to restrain seating-assembly-upward movement of the tether 46 while the airbag assembly 38 is in the deployed position.

Referring now to FIG. 9B, in some embodiments, the anchoring feature 50 may include the armrest 30. The armrest 30 may be positioned and/or shaped such that the tether 46 may become hooked and/or secured underneath the armrest 30. As depicted in FIG. 9B, in some embodiments, the bolster 34 of the armrest 30 may protrude seating-assembly-forward from the support member 32 of the armrest 30 and form a hook-like surface under which the tether 46 may be secured while the airbag assembly 38 is in the deployed position. It is contemplated that the armrest 30 may restrain movement of the tether 46 while the airbag assembly 38 is in the deployed position in a variety ways.

Referring now to FIG. 10B, in some embodiments, the anchoring feature 50 may include an auxiliary hook 52. The auxiliary hook 52 may be positioned and/or shaped such that the tether 46 may become hooked and/or secured by the auxiliary hook 52. As depicted in FIG. 10B, in some embodiments, the auxiliary hook 52 may be coupled to the seat-base 18 and form a surface under which the tether 46 may be secured while the airbag assembly 38 is in the deployed position.

Figure 11B:
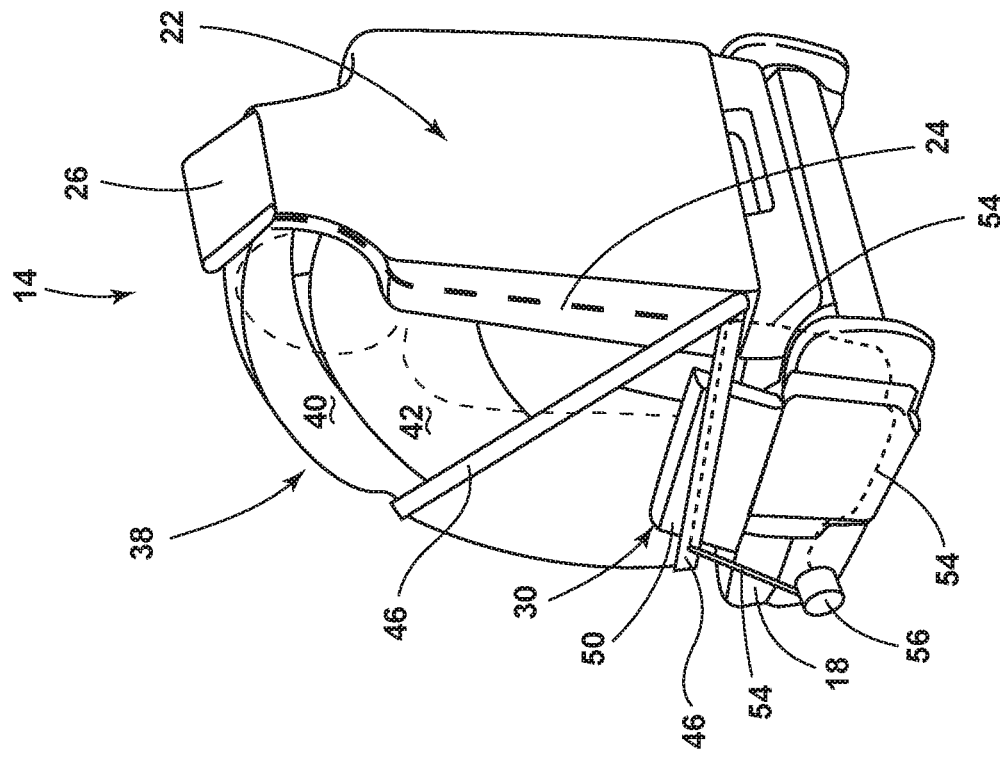
FIG. 11B is a side elevational view of the seating assembly with the airbag assembly in the deployed position, illustrating a cable extending from the retractor and coupled to the tether, according to one embodiment.
Figure 11A:
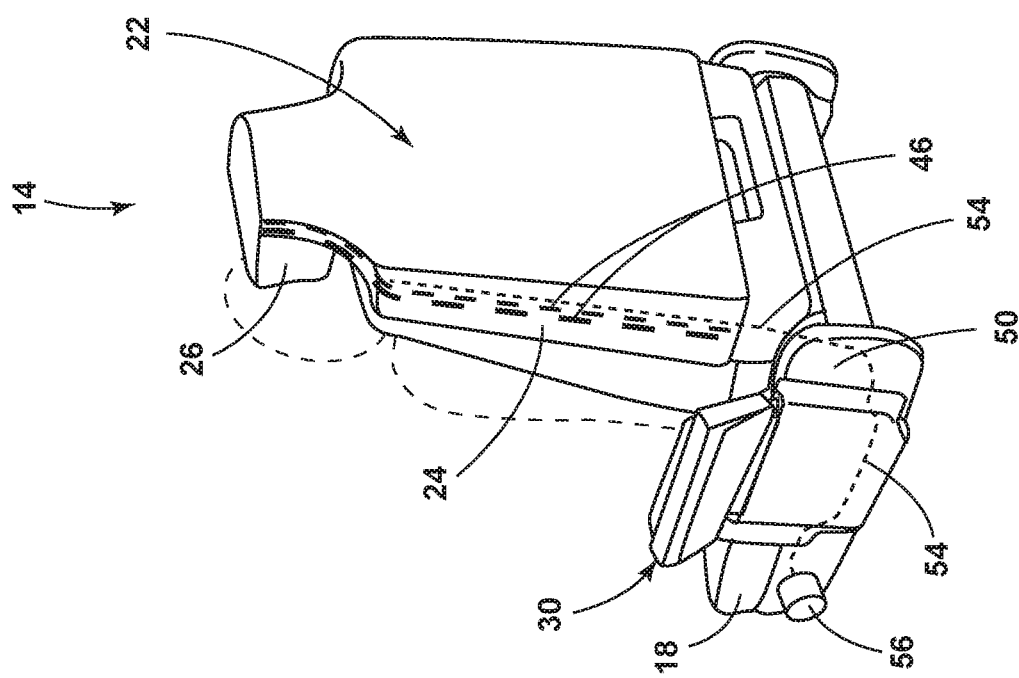
FIG. 11A is a side elevational view of the seating assembly with the airbag assembly in the pre-deployment position, illustrating a retractor coupled to the seating assembly, according to one embodiment.

Referring now to FIGS. 11A and 11B, in some embodiments, the anchoring feature 50 may include a cable 54 coupled to the tether 46. In various embodiments, the cable 54 may be coupled to the tether 46 while the airbag assembly 38 is in the pre-deployment position and the deployed position. In some embodiments, the cable 54 may be at least partially disposed within the seat-base 18 and/or the seatback 22 while the airbag assembly 38 is in the pre-deployment position. In some embodiments, the cable 54 may be coupled to the seat-base 18. In some embodiments, the cable 54 may be operably coupled to a retractor 56 that may be coupled to the seat-base 18. The retractor 56 may be configured to retract the cable 54. In some embodiments, the retractor 56 maybe configured to retract the cable 54 while the airbag assembly 38 is in the deployed position. It is contemplated that the retractor 56 may be prompted to retract the cable 54 by at least one of a host of circumstances that includes, but is not limited, a sudden stop of the vehicle 10, a signal received from the controller 70, a deployment of the airbag assembly 38, and/or a combination thereof. The retractor 56 may be any suitable mechanism for retracting the cable 54 (e.g., winch).

In operation, as illustrated in phantom in FIG. 11A, the cable 54 may first be disposed within the seat-base 18 and/or the seatback 22 while the airbag assembly 38 is in the pre-deployment position. As the airbag assembly 38 moves from the pre-deployment position to the deployed position, the cable 54 may move out from within the seat-base 18 and/or seatback 22 as the airbag assembly 38 deploys and the tether 46 moves out of the seatback 22. This may create slack in the cable 54 as is depicted by the cable 54 shown in phantom in FIG. 11B. The retractor 56 may then retract the cable 54 and take up the slack (see non-phantom cable 54 in FIG. 11B). In some embodiments, the retractor 56 may be configured to retract the cable 54 until a particular length of cable 54 has been retracted. In various embodiments, the cable 54 may be configured to restrain the seating-assembly-upward movement and/or bias seating-assembly-downward movement of the tether 46 and/or the airbag assembly 38.

Referring now to FIGS. 9A-10B, the anchoring feature 50 may be operable between various positions. In some embodiments, movement of the anchoring feature 50 may enable the tether 46 to be hooked and/or secured by the anchoring feature 50, while the airbag assembly 38 is in the deployed position.

In some embodiments, in which the anchoring feature 50 includes the armrest 30, the armrest 30 may be operable between a first position and a second position. In some embodiments, movement from the first positon to the second position may include moving the armrest 30 seating-assembly-upward or seating-assembly-downward. For instance, FIGS. 9A-9B, which depict the support member 32 of the armrest 30 moving between the lowered position and the raised position respectively, may demonstrate movement of the armrest 30 from the first position to the second position, according to one example. It is contemplated that movement of the armrest 30 between the first position and the second position may include at least one of a variety of movements of the armrest 30, the support member 32, and/or the bolster 34. For example, movement of the armrest 30 between the first position and the second position may include, but it not limited to, movement of the armrest 30, the support member 32, and/or the bolster 34 between the raised and lowered positions, the inboard and outboard positions, the forward and rearward positions, and/or a combination thereof.

In some embodiments, in which the anchoring feature 50 includes the auxiliary hook 52, the auxiliary hook 52 may be operable between a stowed position and a use position. In some embodiments, the auxiliary hook 52 may move seating-assembly-upward from the stowed position to the use positon, as shown in FIGS. 10A and 10B, respectively. In some embodiments, the auxiliary hook 52 may move between the stowed and use position by moving, pivoting, sliding, and/or articulating forward, rearward, upward, downward, inboard, outboard, and/or a combination thereof. It is contemplated that, similar to the armrest 30, the auxiliary hook 52 may be moved between the stowed position and the use position by a variety of means (e.g., electric motor, threaded driver screw, recirculating ball race nut, solenoid, etc.). In some embodiments, the auxiliary hook 52 may be generally hidden from the view of a vehicle 10 occupant while the auxiliary hook 52 is in the stowed position.

Figure 12:
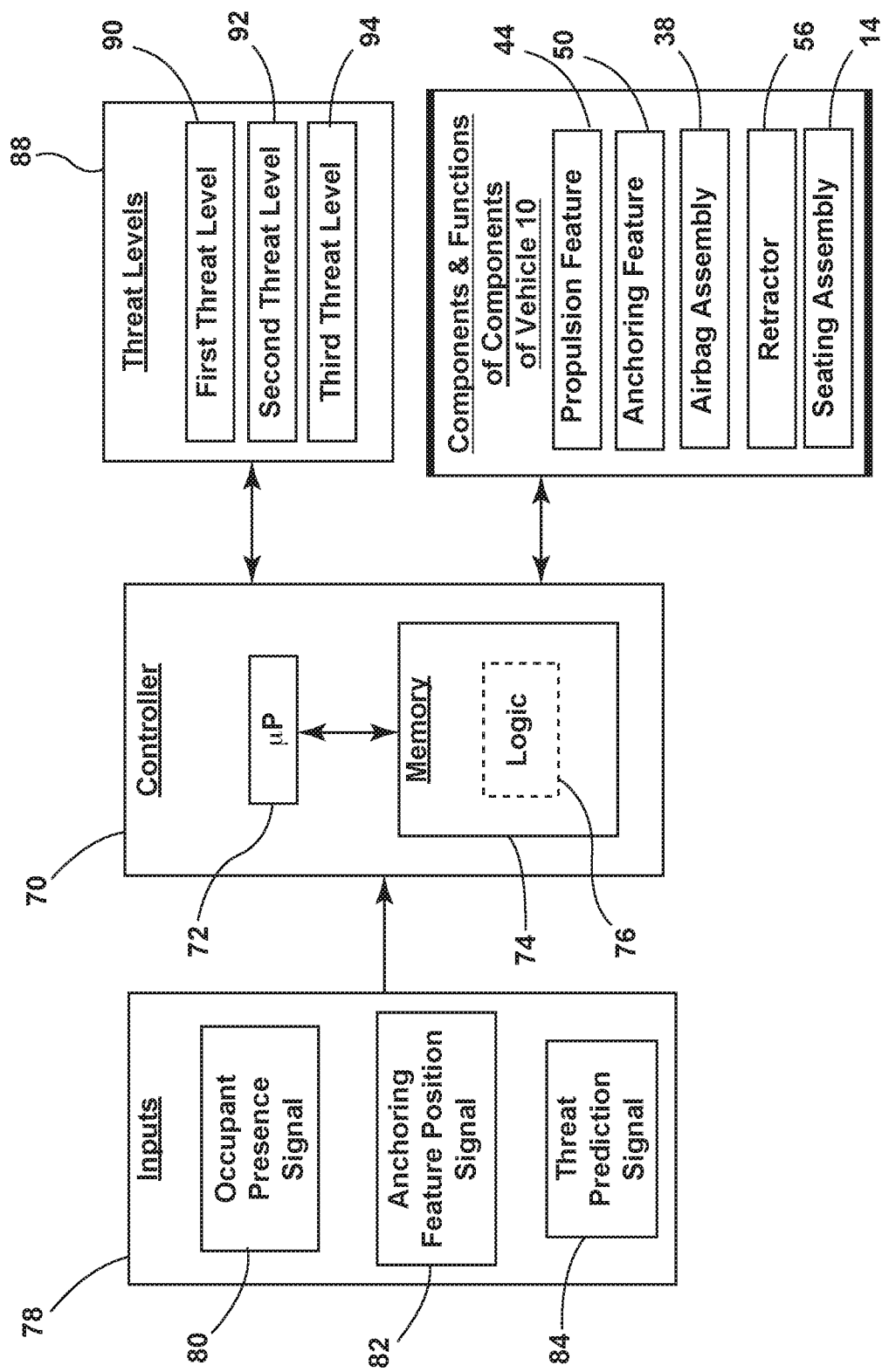
FIG. 12 is a block diagram of the seating assembly and airbag assembly controls, illustrating a controller for controlling the airbag assembly and tether components.

Referring now to FIG. 12, as referenced above, the seating assembly 14 may include the controller 70, which may be configured to receive various inputs 78 and control various outputs. The controller 70 may be a shared or dedicated controller that includes a microprocessor 72 and memory 74 as illustrated, according to various embodiments. It should be appreciated that the controller 70 may include control circuitry such as analog and/or digital control circuitry. Stored within the memory 74 and executed by the microprocessor 72 is logic 76 for processing the various inputs 78 and controlling various outputs described herein. The inputs 78 to the controller 70 may include an occupant presence signal 80, which may be made available from another controller via a vehicle data communication line or a shared bus, and may indicate the presence or absence of an occupant in the seating assembly 14. The presence or absence of an occupant in the seating assembly 14 may be determined through a variety of methods and/or by a variety of features (e.g., weight sensor, proximity sensor, etc). Additionally, the controller 70 may receive an anchoring feature position signal 82 as the input 78. The anchoring feature position signal 82 may be made available from another controller, and may indicate the position of the anchoring feature 50. For example, in an embodiment in which the anchoring feature 50 includes the auxiliary hook 52, the anchoring feature position signal 82 may indicate that the auxiliary hook 52 is in the stowed position, the use position, or a position between the stowed and use positions.

Further, the controller 70 may receive a threat prediction signal 84 as the input 78. The threat prediction signal 84 may indicate a variety of conditions. In some embodiments, the threat prediction signal 84 may indicate a likelihood of impact. In other words, the threat prediction signal 84 may indicate the likelihood of the vehicle 10 colliding with an object outside of the vehicle 10. The likelihood of impact may be determined by accounting for at least one of a host of factors which may include, but is not limited to, speed of the vehicle 10, rate of deceleration of the vehicle 10, proximity of the vehicle 10 to an object, size and/or shape of an object, proximity of the vehicle 10 to an object, direction of movement of the vehicle 10 relative to an object, direction of movement of an object relative to the vehicle 10, and/or speed of movement of an object. The likelihood of impact factors may be determined by a variety of devices that may include, but are not limited to, cameras, proximity sensors, and/or radar sensors. It is contemplated that a variety of other features may be employed for determining the factors of a likelihood of impact.

Referring further to FIG. 12, the controller 70 may classify the threat prediction signal 84 into at least one of a plurality of threat levels 88. In some embodiments, the threat prediction signal 84 may be classified as at least one of a first threat level 90, a second threat level 92, and a third threat level 94. In examples where the threat prediction signal 84 indicates a likelihood of impact, the first threat level 90 may indicate a lower likelihood of impact than the second threat level 92 and the third threat level 94. The second threat level 92 may indicate a higher likelihood of impact than the first threat level 90 and a lower likelihood of impact than the third threat level 94. The third threat level 94 may indicate a higher likelihood of impact than the first threat level 90 and the second threat level 92.

In some embodiments, the inputs 78 to the controller 70 may include various other signals such as signals from other controllers within the vehicle 10 and/or signals sent to the controller 70 by activation of switches by an occupant. The controller 70 may also be connected, interact with, and/or control various other components of the vehicle 10 (e.g., the seating assembly 14, the propulsion feature 44, the anchoring feature 50, the airbag assembly 38, the locking feature 68, the retractor 56, etc.), and the functions of those components (e.g., movement, speed of movement, activation, engagement, deployment, etc.) directly, and/or through communication with another controller. For example, the controller 70 may facilitate the movement of the anchoring feature 50 between positions and the deployment of the airbag assembly 38. In some examples, the controller 70 may facilitate such action by receiving the input 78 (e.g. threat prediction signal 84) and executing the logic 76 stored within the memory 74 with the microprocessor 72.

Figure 13:
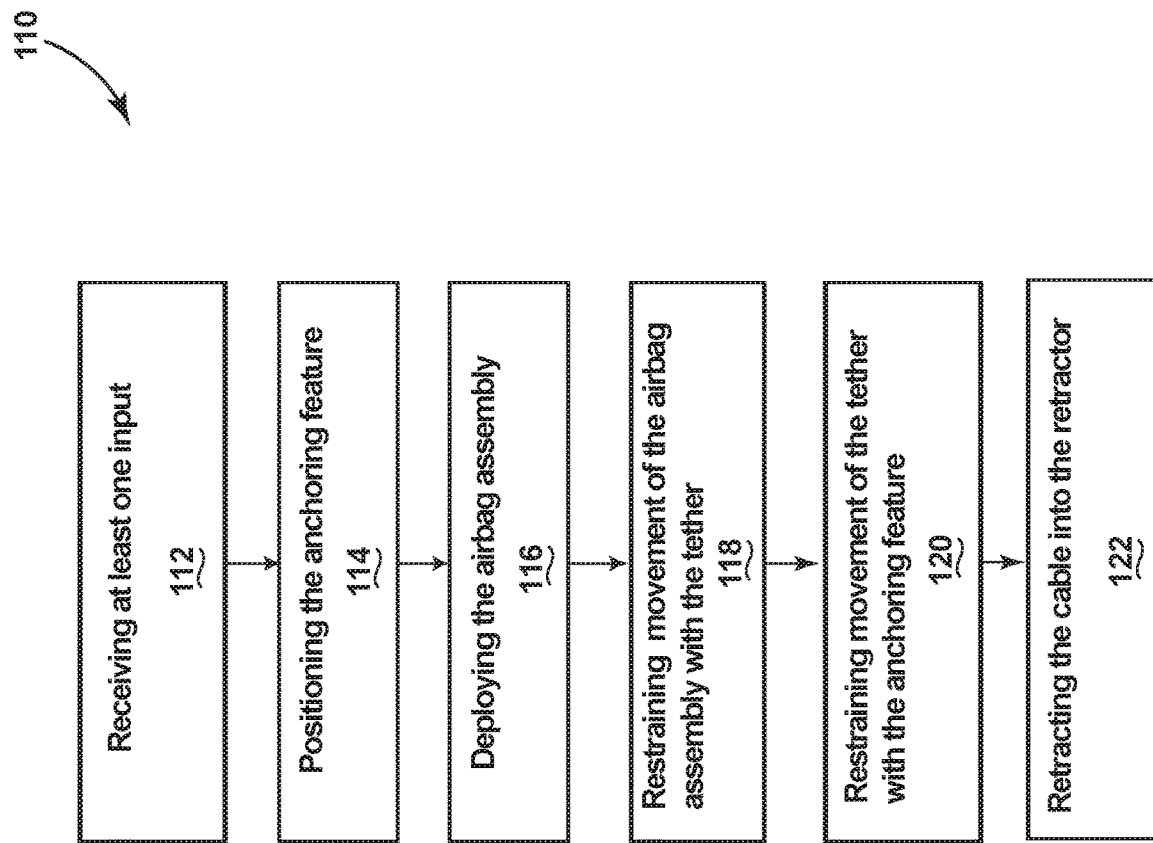
FIG. 13 is a flow chart of a method of operating the seating assembly, according to one embodiment.

In reference to FIG. 13, a method of operating a vehicle seating assembly 110 is disclosed. The method may include the step 112 of receiving at least one input 78. As discussed above, the controller 70 may receive inputs 78 from various sources. In various embodiments, the input 78 may include the occupant presence signal 80, the anchoring feature position signal 82, the threat prediction signal 84, and/or various other signals. In some embodiments, upon receiving the threat prediction signal 84, the controller 70 may classify the threat prediction signal 84 into at least one of the plurality of threat levels 88 (e.g., the first threat level 90, the second threat level 92, the third threat level 94). The controller 70 may determine a change in threat levels 88. In some embodiments, the controller 70 may determine a change in threat levels 88 by utilizing the logic 76 within the memory 74 and/or the microprocessor 72.

Next, the method of operating a vehicle seating assembly 110 may include the step 114 of positioning the anchoring feature 50. As discussed above, in embodiments in which the anchoring feature 50 includes the armrest 30, positioning the anchoring feature 50 may include moving the armrest 30 from the first position to the second position. In embodiments in which the anchoring feature 50 includes the auxiliary hook 52, positioning the anchoring feature 50 may include moving the auxiliary hook 52 from the stowed position to the use position.

In various embodiments, the anchoring feature 50 may be positioned in response to the controller 70 receiving at least one input 78. In some embodiments, the anchoring feature 50 may be moved between positions in response to an occupant presence signal 80. In some embodiments, the anchoring feature 50 may be moved between positions in response to the threat prediction signal 84, a classification of the threat prediction signal 84 into one of the threat levels 88, and/or a determination of a change in threat levels 88. For example, the armrest 30 may move from the first position to the second position in response to the controller 70 determining that the threat prediction signal 84 is reclassified from the first threat level 90 to the second threat level 92. In some examples, the auxiliary hook 52 may move from the stowed position to the use position in response to a change in threat levels 88.

Next, the method of operating a vehicle seating assembly 110 may include the step 116 of deploying the airbag assembly 38. As discussed above, the airbag assembly 38 may be deployed from the seatback 22, the headrest 26, and/or a feature coupled to the seatback 22 and/or headrest 26 (e.g., external airbag compartment). In some embodiments, the airbag assembly 38 may be deployed from within the seatback 22, the headrest 26, and/or a feature coupled to the seatback 22 and/or headrest 26 (e.g., external airbag compartment).

In various embodiments, the airbag assembly 38 may be configured to deploy in response to the controller 70 receiving at least one input 78. In some embodiments, the airbag assembly 38 may be configured to deploy in response to the threat prediction signal 84, a classification of the threat prediction signal 84 into at least one of the threat levels 88, and/or a determination of a change in threat levels 88. For example, the airbag assembly 38 may deploy in response to the controller 70 determining that the threat prediction signal 84 is reclassified from the second threat level 92 to the third threat level 94.

Next, the method of operating a vehicle seating assembly 110 may include the step 118 restraining movement of the airbag assembly 38 with the tether 46 coupled to the airbag assembly 38. In some embodiments, the tether 46 may restrain seating-assembly-forward movement of the airbag assembly 38. In some embodiments, the tether 46 may restrain seating-assembly-upward movement of the airbag assembly 38. It is contemplated that, in some embodiments, the tether 46 may restrain and/or bias movement of the airbag assembly 38 in a variety of seating-assembly directions.

Next, the method of operating a vehicle seating assembly 110 may include the step 120 of restraining movement of the tether 46 coupled to the airbag assembly 38 with the anchoring feature 50 coupled to at least one of the seatback 22 and the seat-base 18. In some embodiments, the anchoring feature 50 may restrain seating-assembly-upward movement of the tether 46. In some embodiments, the anchoring feature 50 may restrain seating-assembly-inboard movement of the tether 46. It is contemplated that in some embodiments, the anchoring feature 50 may restrain and/or bias movement of the tether 46 in a variety of seating-assembly directions. As discussed above, the anchoring feature 50 may include at least one of the armrest 30, the auxiliary hook 52, and the cable 54. In some embodiments, the step 120 of restraining movement of the tether 46 with the anchoring feature 50 may include securing and/or hooking the tether 46 beneath the anchoring feature 50.

Next, the method of operating a vehicle seating assembly 110 may include the step 122 of retracting the cable 54 into the retractor 56. As discussed above, in some embodiments, the retractor 56 may be configured to retract the cable 54 until a particular length of the cable 54 has been retracted or has been left un-retracted. In some embodiments, the cable 54 may be retracted in response to a slackening of the cable 54, and/or the airbag assembly 38 deploying.

In some embodiments, the cable 54 may be retracted by the retractor 56 in response to the controller 70 receiving at least one input 78. In some embodiments, cable 54 may be retracted in response to the occupant presence signal 80. In some embodiments, the cable 54 may be retracted in response to the threat prediction signal 84, a classification of the threat prediction signal 84 into one of the threat levels 88, and/or a determination of a change in threat levels 88. For example, the cable 54 may be retracted in response to the controller 70 determining that the threat prediction signal 84 is reclassified from the first threat level 90 to the second threat level 92.

It is to be understood that unless specifically stated otherwise in the claims, that the steps of the method of operating a vehicle seating assembly 110 need not be performed in the order that each step is listed above.

Use of the present disclosure may provide a variety of advantages. First, the airbag assembly 38 may be coupled to and move with the seating assembly 14 and may, therefore, provide an occupant with protection, irrespective of the position of the seating assembly 14 within the vehicle 10. Second, the tether 46 may restrain movement of the airbag assembly 38 while the airbag assembly 38 is in the deployed position, which may increase the safety of a seat occupant in the event of a crash. Third, the anchoring feature 50 may restrain seating-assembly-upward movement of the tether 46, which may, in turn, restrain seating-assembly-upward movement of the airbag assembly 38, which may increase the safety of a seat occupant in the event of a vehicle 10 rollover, by keeping the airbag assembly 38 in its correct deployed position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly, comprising:
    a seatback coupled to a seat-base;
    an airbag assembly coupled to the seatback and configured to deploy therefrom;
    a tether coupled to the airbag assembly and at least one of the seatback and the seat-base;
    a cable coupled to the tether; and
    a retractor coupled to the seat-base and configured to retract the cable.

2. The vehicle seating assembly of claim 1, wherein the airbag assembly comprises:
    a side airbag configured to deploy out of a lateral side of the seatback.

3. The vehicle seating assembly of claim 2, wherein the airbag assembly further comprises:
    an overhead airbag configured to deploy seating-assembly-laterally-inboard of the side airbag.

4. The vehicle seating assembly of claim 1, wherein the retractor is further configured to retract the cable when the airbag assembly is in a deployed position.

5. The vehicle seating assembly of claim 1, wherein the cable is partially disposed within at least one of the seat-base and the seatback while the airbag assembly is in a pre-deployment position.

6. A vehicle seating assembly, comprising:
    a seatback coupled to a seat-base;
    an airbag assembly coupled to the seatback and configured to deploy therefrom, wherein at least a portion of the airbag assembly is configured to deploy out of the seatback;
    a tether coupled to the airbag assembly and at least one of the seatback and the seat-base; and
    an anchoring feature configured to restrain seating-assembly-upward movement of the tether, coupled to at least one of the seatback and the seat-base.

7. The vehicle seating assembly of claim 6, wherein the airbag assembly comprises:
    A side airbag configured to deploy out of a lateral side of the seatback.

8. The vehicle seating assembly of claim 7, wherein the airbag assembly further comprises:
    an overhead airbag configured to deploy seating-assembly-laterally-inboard of the side airbag.

9. The vehicle seating assembly of claim 6, wherein the anchoring feature comprises:
    a cable; and
    a retractor configured to retract the cable.

10. The vehicle seating assembly of claim 6, wherein the anchoring feature comprises:
    an auxiliary hook coupled to the seat-base.

11. The vehicle seating assembly of claim 10, wherein the auxiliary hook is operable between a stowed position and a use position.

12. The vehicle seating assembly of claim 6, wherein the anchoring feature comprises:
   an armrest.

13. A method of operating a vehicle seating assembly, comprising:
   deploying an airbag assembly from a seatback of a vehicle seating assembly that includes a seat-base coupled to the seatback;
   restraining seating-assembly-forward movement of the airbag assembly with a tether coupled to the airbag assembly; and
   restraining seating-assembly-upward movement of the tether with an anchoring feature coupled to the seat-base.

14. The method of operating a vehicle seating assembly of claim 13, further comprising the step of:
   positioning the anchoring feature.

15. The method of operating a vehicle seating assembly of claim 14, wherein the anchoring feature is an auxiliary hook.

16. The method of operating a vehicle seating assembly of claim 15, wherein the step of positioning the anchoring feature further comprises the step of:
   moving the auxiliary hook from a stowed position to a use position.

17. The method of operating a vehicle seating assembly of claim 14, wherein the anchoring feature is an armrest.

18. The method of operating a vehicle seating assembly of claim 17, wherein the step of positioning the anchoring feature further comprises the step of:
   moving the armrest from a first position to a second position.

19. The method of operating a vehicle seating assembly of claim 13, wherein the anchoring feature is a cable coupled to the tether.

20. The method of operating a vehicle seating assembly of claim 19, further comprising the step of:
   retracting the cable into a retractor coupled to the seat-base.

* * * * *